UNITED STATES PATENT OFFICE.

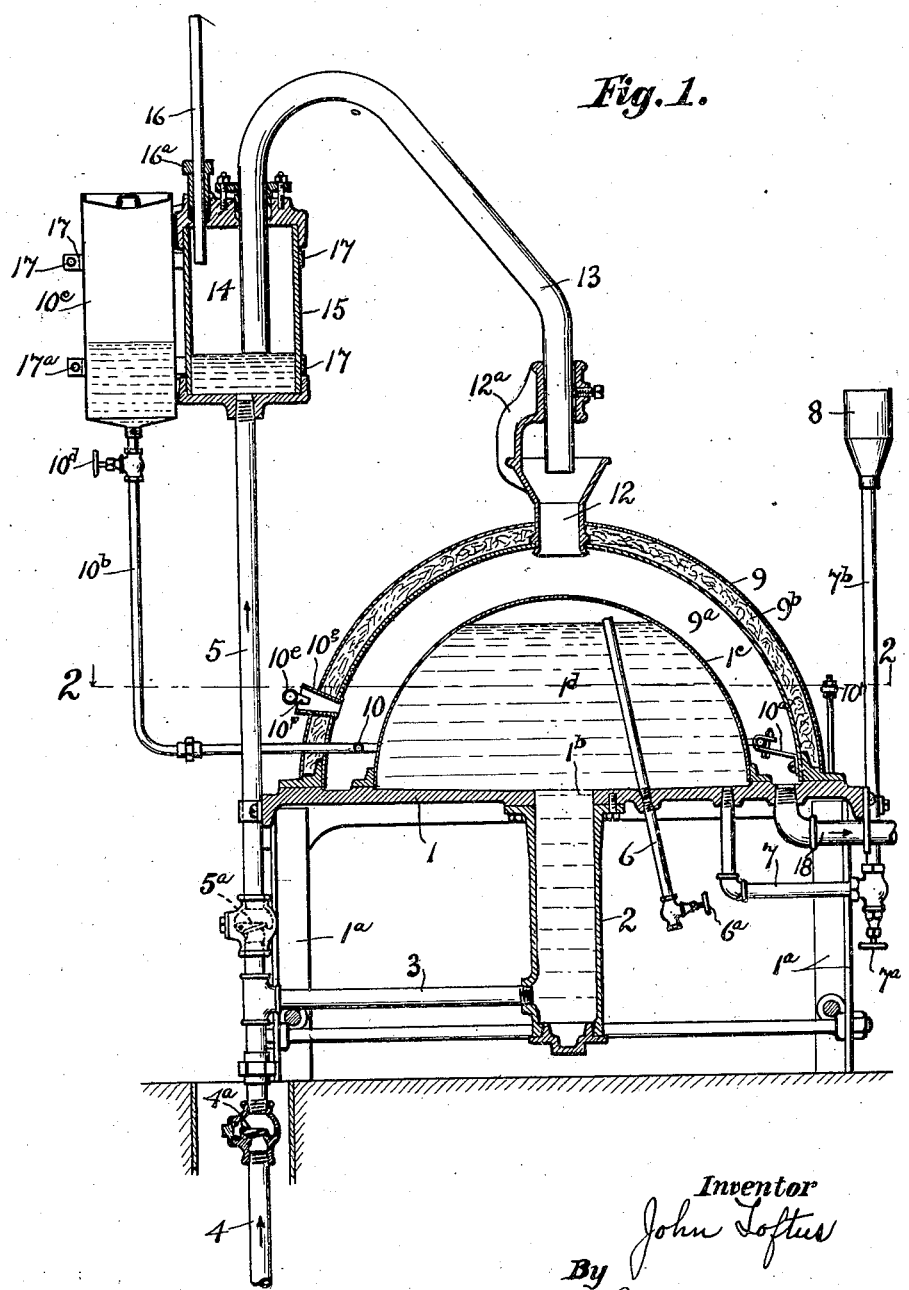

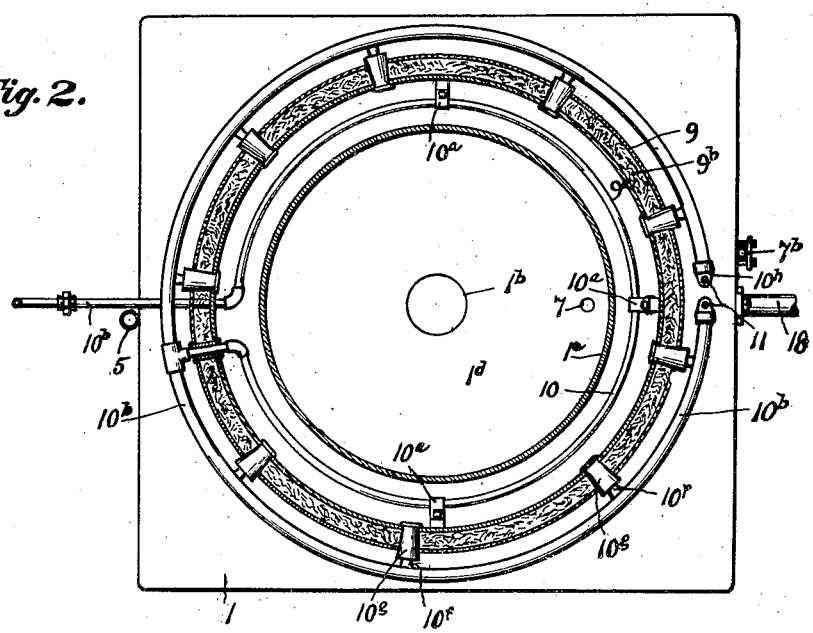
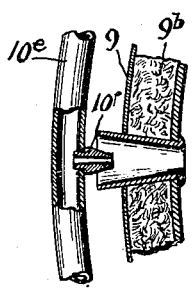
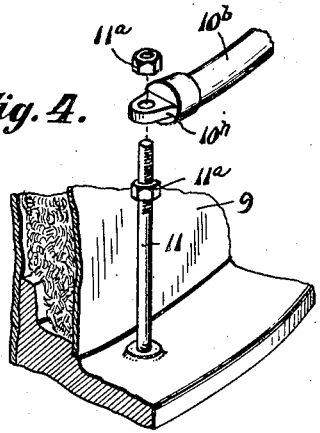

JOHN LOFTUS, OF ALBANY, NEW YORK.

PUMP.

1,342,176.  Specification of Letters Patent.  Patented June 1, 1920.

Application filed December 5, 1919. Serial No. 342,743.

*To all whom it may concern:*

Be it known that I, JOHN LOFTUS, a citizen of the United States, residing at Albany, in the county of Albany and State of New York, have invented certain new and useful Improvements in Pumps, of which the following is a specification.

My invention relates to improvements in pumps, the present embodiment of the invention relating more particularly to what may be termed a "steam and vacuum operated pump."

It will be apparent, however, and should be understood, that the principles of this invention may be readily applied to or incorporated in various analogous structures, such as engines, or the like, and are capable of a relatively wide use and application.

The primary object of the invention is the provision of a generally improved pump of the general character indicated which will be exceedingly simple in construction, cheap of manufacture and efficient in use.

A further and very important object is the provision of a pump of this class in which the working impulses will be automatically produced through the successive power of steam and vacuum produced in a novel and improved manner in a vaporizing and condensing chamber and a surrounding heating and cooling chamber with a minimum consumption of liquid and fuel and a maximum amount of power.

A still further object is the provision of a novel construction and arrangement of inner and outer chamber forming vessels, the walls of the inner vessel being formed of relatively thin heat conducting material and the walls of the outer vessel being of relatively fixed heat insulating material, together with improved intermittently operating liquid cooling siphon mechanism and heat creating means communicating between the outer and inner vessels and adapted to alternately cool the inner vessel whereby vaporizing pressures and condensing and vacuum creating reactions take place in the flow of liquid through the pump.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a central vertical sectional view of a pump constructed in accordance with this invention.

Fig. 2, a horizontal cross sectional view taken on line 2—2 of Fig. 1.

Fig. 3, an enlarged fragmentary horizontal sectional view of a portion of the heat insulated outer or dome shaped vessel and one of the burner jet mixer openings therein, together with one of the burner nozzles and the feed pipe or coil therefor.

Fig. 4, a fragmentary perspective view of the base of the outer heat insulated vessel or dome, together with a disassembled view of one of the terminal portions of the vaporizing feed coil or pipe and means for connecting and securing the same in position.

Similar numerals of reference designate like parts throughout all the figures of the drawings.

The improved pump comprises a suitable supporting base 1, mounted, in the present instance, on suitable supports or legs $1^a$.

As a means of forming a suitable inner vessel forming a suitable vaporizing and condensing chamber, the base 1, is provided with a central opening $1^b$, and the walls of the vessel $1^c$, are formed of relatively thin heat conducting material, the walls of said inner vessel, in the present instance, being of substantially semi-spherical shape, as shown, and conjointly with the supporting base 1, forming a liquid vaporizing and condensing chamber $1^d$. The chamber $1^d$, is preferably provided with a subjacent liquid supply head or cylinder 2, the latter being adapted to be supplied through a suitable inlet pipe 3, communicating with a main or valved inlet pipe 4, communicating with a suitable source of liquid supply.

The inlet pipe 4, is provided below the level of the conduit pipe 3, with a check valve $4^a$, so as to permit the flow of liquid into the supply head 2, and chamber $1^d$, and prevent retrograde movement of the liquid therein during the working impulse of the pump through steam pressure, as hereinafter explained, and when the liquid flows out of the pipe 3, into the discharge pipe 5, the latter being provided with a check valve $5^a$, immediately above the common liquid pipe 3.

As a means of initially filling the vaporizing and condensing chamber $1^d$, of the inner vessel $1^c$, the base member 1, is provided with a vent pipe 6, communicating with the upper portion of the chamber 1ᵈ, and provided at its lower end with a valve 6ᵃ. The base 1, is provided with a second opening having a liquid conduit pipe 7, the latter being provided with a valve 7ᵃ, and having a vertically extending pipe 7ᵇ, terminating in a funnel or filler vessel 8.

When it is desired to start the pump the chamber 1ᵈ, and pipe system may be filled with liquid by opening the valve 6ᵃ, of the vent pipe 6, and pouring liquid into the chamber through the medium of the funnel vessel 8, and pipes 7ᵇ and 7, leading into the chamber 1ᵈ, the vent pipe 6, permitting the escape of air while the liquid is being filled to substantially the level indicated in Fig. 1, of the drawings, after which the valves 6ᵃ and 7ᵃ are closed.

As a means for forming a combined heating and cooling chamber about the walls of the inner vessel 1ᶜ, an outer similarly shaped vessel 9, is provided, the walls of the vessel 9, being spaced from the walls 1ᶜ, forming a surrounding heating and cooling chamber 9ᵃ. The walls of the outer vessel are preferably heat insulated by providing inner and outer walls with an interposed filler of heat insulating material 9ᵇ, such as fire clay, mineral wool, asbestos, or the like.

As a means of heating the walls of the inner vessel 1ᶜ, for the generation of steam or vapor, the base of the heating and cooling chamber 9ᵃ, is provided with a vaporizing coil 10, supported on suitable brackets 10ᵃ, and communicating with a suitable source of liquid fuel supply through the medium of a suitable feed pipe 10ᵇ, leading to a tank 10ᶜ, the flow of liquid fuel supply being controlled through the medium of a valve 10ᵈ. After the liquid fuel is vaporized in the vaporizing coil 10, it passes into a burner coil 10ᵉ, the branches of such coil extending about the outer vessel and being provided with a series of burners 10ᶠ, adapted to discharge into a plurality of mixer openings 10ᵍ, formed through the walls of the outer vessel. It will be obvious that the flames issuing from the burners 10ᶠ, through the mixer openings 10ᵍ, will be discharged over the relatively thin walls of the inner vessel 1ᶜ.

The terminal portions of the branch burner pipe 10ᵉ, are provided with terminal lugs 10ʰ, provided with openings adapted to be fitted over supporting stems 11, the latter being threaded and provided with clamping nuts 11ᵃ.

As a means of providing a flue opening for the burners 10ᶠ, in supporting combustion in the heating chamber 9ᵃ, and also providing an inlet for the discharge of liquid over the inner vessel 1ᶜ, for cooling the latter and condensing the steam or vapor and forming a vacuum therein, the top of the outer vessel is provided with a combined flue and liquid inlet opening 12, the latter being formed by means of a suitable funnel shaped casting and the casting being provided with a bracket 12ᵃ, adapted to removably receive and contain a siphon pipe 13, the latter communicating with a siphon chamber 14, and the siphon chamber 14, being formed by means of a suitable vessel or container 15, mounted upon and communicating with the discharge pipe 5.

As a means of regulating the predetermined amount of liquid adapted to accumulate in the siphon chamber 14, before the siphon 13, is brought into action, the top of the siphon vessel 15, is provided with an adjustably mounted vent and gage pipe 16, secured by means of a packing and a packing nut 16ᵃ.

The liquid fuel supply tank 10ᶜ, may be secured to the vessel 15, by means of clamping bands 17, surrounding the said tanks or vessels and connected by means of connecting elements 17ᵃ.

In view of the construction hereinbefore described, it will be understood that upon filling the inner vessel and supply pipe with liquid and igniting the burners 10ᶠ, that the flames from the latter directed over and against the relatively thin walls 1ᶜ, of the inner vessel will vaporize the liquid therein, thereby causing an accumulation of steam or vapor and the pressure thereof will force the liquid downwardly and outwardly through the head or cylinder 2, the check valve 4ᵃ, in the main inlet pipe 4, preventing any retrograde movement of the liquid therein, thereby opening the check valve 5ᵃ, in the discharge pipe 5, and causing the liquid to flow upwardly and into the siphon chamber 14, where it accumulates until it reaches the lower end of the vent and gage pipe 16, and the siphon pipe 13, then being brought into action the liquid will be transferred from the siphon chamber through the flue and inlet opening 12, and downwardly over the relatively thin conducting walls 1ᶜ, of the inner vessel thereby cooling the latter and causing a condensation of the vapor or steam and creating a vacuum in the upper portion thereof. In so doing the liquid passing downwardly over the dome shaped walls 1ᶜ, will also cool the vaporizing coil so that little vapor will reach the burners 10ᶠ, and but little flame issue therefrom. The condensation and vacuum thus produced will result in a reverse movement of the liquid to fill the vacuum thus formed whereupon the valve 4ᵃ, in the main inlet pipe 4, will open to permit a flow of liquid through the pipe 3, into the cylinder 2, and upwardly into the inner vessel. During such action the flow of liquid through the siphon will have ceased and the liquid accumulating in the lower portion of the cooling chamber 9ᵃ, will have passed outwardly from the latter through the discharge pipe 18, after which the heating and vaporizing action will again take place and the operation will be repeated as before described.

From the foregoing description, taken in connection with the accompanying drawings, the operation and advantages of my invention will be readily understood.

Having thus described one of the embodiments of my invention, without having attempted to set forth all the forms in which it may be made and all the modes of its use, what I claim and desire to secure by Letters Patent, is,—

1. A steam and vacuum pump, comprising a liquid chamber provided with a supply and discharge head, a valved liquid supply pipe communicating with the latter, a valved discharge pipe terminating in a siphon chamber, a heating and cooling chamber surrounding said liquid chamber, a siphon intermittently discharging from said siphon chamber to said heating and cooling chamber, and means for heating said liquid chamber between the discharges from said siphon pipe.

2. A steam and vacuum pump, comprising a liquid chamber provided with a subjacent liquid supply and discharge head, a valved liquid supply pipe communicating with the latter, a valved discharge pipe leading from said head, a siphon chamber connected to said valved discharge pipe, a heating and cooling chamber surrounding said liquid chamber and provided with a liquid discharge pipe, a siphon pipe intermittently discharging from said siphon chamber to said heating and cooling chamber, and means in the latter for heating said liquid chamber between the discharges from said siphon pipe.

3. In a steam and vacuum pump, a liquid chamber, a source of liquid supply provided with a valved supply pipe communicating with said chamber, a valved discharge pipe leading from the latter, a siphon chamber communicating with said valved discharge pipe, heat insulated walls about the walls of said liquid chamber forming a surrounding heating and cooling chamber, a siphon extending between said siphon chamber and said heating and cooling chamber and intermittently discharging into the latter and cooling said liquid chamber, and means controlled by said siphon discharges for heating said liquid chamber.

4. In a steam and vacuum pump, a liquid chamber, a source of liquid supply provided with a valved supply pipe communicating with said chamber, a valved discharge pipe leading from said chamber, a siphon chamber on said valved discharge pipe, heat insulated walls surrounding the walls of said liquid chamber forming a heating and cooling chamber, the latter being provided with a liquid discharge pipe, a siphon extending between said siphon chamber and said heating and cooling chamber and adapted to intermittently discharge into the latter and cool said liquid chamber, and means for heating said liquid chamber between the discharges from said siphon.

5. A steam and vacuum operated pump, comprising a vaporizing and condensing chamber, heat insulated walls surrounding said conducting walls forming a surrounding combustion and cooling chamber, means for intermittently heating and cooling said vaporizing and cooling chamber, means for initially filling the latter with a vaporizable liquid, valved supply pipes and a discharge pipe communicating with said vaporizing and condensing chamber, and said combustion and cooling chamber, respectively, and a siphon chamber and siphon communicating with and intermittently receiving fluid from said vaporizing and condensing chamber and intermittently discharging the same into said combustion and cooling chamber.

6. A steam and vacuum operated pump, comprising conducting walls forming a vaporizing and condensing chamber, heat insulated walls surrounding and spaced from said conducting walls forming a surrounding combustion and cooling chamber, means in the latter for intermittently heating the walls of said vaporizing and cooling chamber, means for initially filling the latter with a vaporizable liquid, valved supply pipes communicating with said vaporizing and condensing chamber, and a siphon chamber and siphon intermittently receiving fluid from said valved supply pipes and discharging the same into said cooling chamber and over said conducting walls of said vaporizing and condensing chamber.

7. A steam and vacuum pump, comprising a supporting base provided with a dome shaped heat conducting wall conjointly forming a liquid chamber, a valved liquid conduit communicating with said chamber, a valved discharge pipe communicating with said chamber, a siphon chamber communicating with said discharge pipe, means for regulating the quantity of liquid discharged into said siphon chamber, a dome shaped heat insulated wall spaced from said dome shaped conducting walls forming a surrounding heating and cooling chamber provided at its top with a flue and liquid inlet opening, a vaporizing coil in said heating and cooling chamber and provided with burner nozzles arranged to discharge against said conducting walls of said liquid chamber, and a siphon leading from said siphon chamber and adapted to intermittently discharge liquids into said cooling and heating chamber.

8. A steam and vacuum pump, comprising a supporting base provided with a dome shaped heat conducting wall conjointly forming a liquid chamber, a liquid conduit communicating with said chamber and provided with a valve to prevent retrograde movement of liquid, a discharge pipe communicating with said chamber and provided with a valve to prevent retrograde movement therein when the liquid in said supply pipe is flowing into said chamber, a siphon chamber communicating with said discharge pipe, a dome shaped heat insulated wall surrounding and spaced from said dome shaped conducting walls forming a surrounding heating and cooling chamber and provided at its top with a combined flue and liquid inlet opening, a vaporizing coil in said heating and cooling chamber and provided with burner nozzles arranged to discharge in said heating and cooling chamber and against said conducting walls of said liquid chamber, and a siphon leading from said siphon chamber and adapted to intermittently discharge liquids into said combined flue and liquid inlet openings.

9. In a pump, a central liquid head terminating in an enlarged superposed semispherical shaped liquid vaporizing and condensing vessel, a like shaped heat insulated vessel spaced from and surrounding the latter and forming conjointly therewith an intermediate similar shaped heating and cooling chamber, a liquid inlet conduit leading to said central liquid head and provided with a valve adapted to prevent retrograde movement of the liquid therein, a liquid outlet conduit communicating with said liquid head and provided with a valve to permit a flow of liquid in an outward direction only, a siphon chamber communicating with said liquid outlet conduit, means for regulating the quantity of liquid flowing into and out of said siphon chamber, a siphon leading from said siphon chamber to said heating and cooling chamber and intermittently discharging liquid thereon, and fuel vaporizing and burner means controlled by said siphon discharges for heating said inner vessel.

10. In a pump, a central liquid head terminating in an enlarged superposed semispherical shaped liquid vaporizing and condensing vessel, a like shaped heat insulated vessel spaced from and surrounding the latter and forming conjointly therewith an intermediate similar shaped heating and cooling chamber, a liquid inlet conduit leading to said central liquid head and provided with a valve adapted to prevent retrograde movement of the liquid therein, a liquid outlet conduit communicating with said liquid head and provided with a valve to permit a flow of liquid in an outward direction only, a siphon chamber communicating with said liquid outlet conduit and adapted to receive a predetermined quantity of liquid therein, a siphon leading from said siphon chamber to said heating and cooling chamber between said heat condensing and insulated vessels and intermittently discharging liquid therein, and fuel vaporizing and burner coils surrounding said inner and outer vessels respectively and adapted to heat said inner vessel between the cooling discharges of liquid from said siphon.

In testimony whereof I have affixed my signature.

JOHN LOFTUS.